April 3, 1945. W. E. CRAWFORD 2,372,712
BUTT WELDED JOINT BETWEEN LINED PARTS
Filed Dec. 1, 1941
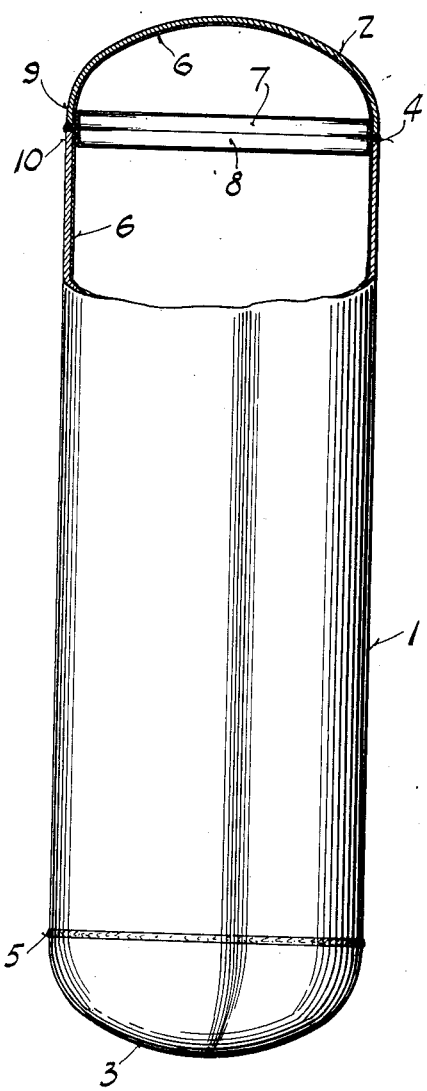
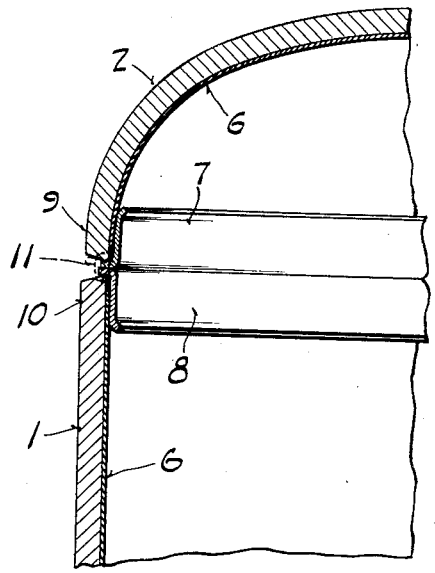
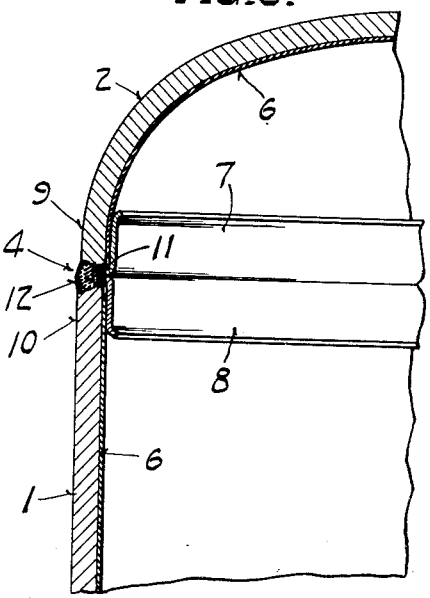
William E. Crawford
INVENTOR.
BY
ATTORNEY.

Patented Apr. 3, 1945

2,372,712

UNITED STATES PATENT OFFICE 2,372,712

BUTT-WELDED JOINT BETWEEN LINED PARTS

William E. Crawford, Wauwatosa, Wis., assignor to A. O. Smith Corporation, Milwaukee, Wis., a corporation of New York Application December 1, 1941, Serial No. 421,206

6 Claims. (Cl. 285—111)

This invention relates to the construction of joints between lined members and more particularly to the joining together of generally tubular parts such as the head skirt and shell of a hot water storage tank lined with fused ceramic enamel or other similar lining.

The principal object of the invention is to join together tubular members such as the head and shell of a hot water tank, lined with fused ceramic enamel, by a welded joint in which the metal at the joint is protected from corrosion to thereby provide a strong, durable structure.

Other objects and advantages of the invention will appear in the following description and accompanying drawing illustrating an embodiment of the invention.

In the drawing:

Figure 1 is a side elevational view of a hot water tank in which the upper portion has been broken away and sectioned;

Fig. 2 is an enlarged sectional view through the joint between the head and shell after assembly and initial welding, and before the final welding, and Fig. 3 is a view similar to Fig. 2 after the final welding of the joint.

Referring to the drawing, there is illustrated a hot water storage tank having a sheet metal shell 1 of generally cylindrical shape constructed from any suitable metal.

The upper head 2 and the lower head 3 of the tank are made of relatively lighter gauge sheet metal, but similar in composition to that of the shell 1. Although a generally convex shape in the heads is preferred, the heads may be of any shape as long as their respective outer skirts are adapted to be disposed in end to end and substantially circumferential alignment with the end edges of the shell 1 to provide the butt welded joints 4 and 5 when welded together. The skirts of the heads and the ends of the shell may be chamfered or beveled to provide a groove for receiving the weld metal deposited in the butt joints 4 and 5.

The joints 4 and 5 are preferably alike and therefore the description hereafter is limited to only the joint 4 between the upper head 2 and the shell 1.

The upper head 2 and the shell 1 are interiorly lined with a corrosion resistant material 6 such as fused ceramic enamel or galvanizing to protect the tank from corrosion while in service. Ceramic enamel is preferably employed and this is applied and fused to the interior surfaces of the head and shell prior to assembly.

The relatively thin sheet metal flanged rings 7 and 8 of generally L shape are provided in the joint between the head and shell. The foot of each ring is turned outwardly at substantially right angles to the body portions of each respective ring and the ends of the body portions, farthest removed from the feet, are curled inwardly. This manner of construction provides a spring effect in the rings that disposes the respective end sections of the body portions in tightly fitting engagement with the lining of the tank when the rings are assembled with the structure.

The rings 7 and 8 are made of corrosion resistant alloy and in their construction care is taken to approach the maximum tolerance limits in the diameter of the shell and head, rather than the minimum limits. This better adapts the rings for employment with tanks approaching maximum as well as minimum dimensional tolerance limits. It also effectively promotes the spring effect of the rings previously described and the right contact of the outwardly curled portion with the lining of the tank.

The alloy ring 7 is disposed at the end edge of the skirt 9 of the head 2. The body of the ring overlaps the interior lined surface 6 of the head 2 and extends for a substantial distance in this overlapping manner toward the crown of the head. The foot of the ring 7 preferably overlaps only a portion of the end of the skirt 9 within the joint 4.

The ring 8 is similarly disposed with respect to the end of the shell 1. The body portion of the ring 8 overlaps that part of the interior lined surface of the shell extending adjacently away from the edge 10. The foot of the ring 8 slightly overlaps the end of the edge 10 and is disposed in the joint 4 between the head 2 and the shell 1 in abutting relation with the ring 7 similarly assembled in the joint 4 on the skirt of the head.

The rings 7 and 8 are thin so that they will readily conform to the shape of the members to which they are applied and the flanges and curled ends of the rings prevent buckling of the latter when inserted in members of slightly smaller diameter under conditions tending to compress the rings circumferentially.

After assembly, the flanges on the rings, that abut one another and extend between the edges of the shell and head, are first fused together by an electric arc and a bead of alloy weld metal 11 is deposited in the bottom of the welding groove to provide the inner part of the welded joint, as shown in Fig. 2. The weld metal 11 is fused with the flanges of the rings 7 and 8 and also with the metal of the head 2 and shell 1. Next, the welding groove is filled with a weld deposit 12 which is of ordinary steel composition and which is fused by the electric arc with the alloy bead 11 and with the respective opposed edges of the head 2 and shell 1 to complete the joint 4.

In manufacturing and assembling the hot water tank illustrated and described, the shell 1 is first rolled from suitable sheet metal and then welded along its longitudinally extending seam. The heads 2 and 3 are next fabricated into a generally convex shape from the same kind of metal as that of the shell, but of a relatively lighter gauge. The diameter of the skirts 9 of the heads is preferably slightly less than that of the shell as shown in the drawing.

The shell and heads are next sprayed with ceramic enameling material on their interior surfaces and the enamel is then fused to provide the corrosion resistant lining 6 on the inside of the tank.

The rings 7 and 8 are fabricated from corrosion resistant alloy metal. Each ring is provided with an outwardly extending foot and a substantially cylindrical body portion disposed at right angles to the foot. The body portion is provided at its free end with an inwardly turned end section to stiffen the same radially and to facilitate insertion of the ring in the end of a member to be joined.

Referring now only to the assembly of the head 2 with the shell 1, as the assembly of the head 3 is similar thereto, the thin alloy ring 8 is first assembled by inserting the body of the ring in the end of the shell 1. The ring is disposed with respect to the shell 1 in such a manner that the body of the strip or ring lies generally parallel to the ceramic lining 6 and the foot substantially overlaps the end of the edge 10 within the joint 4. The alloy ring 7 is assembled with the head 2 in a similar manner as the strip 8 is assembled with the shell 1.

After the rings are assembled as described, they are held in place while the end of head 2 is circumferentially aligned with the end of the shell 1 in the position illustrated by Fig. 2 and with the rings 7 and 8 abutting one another and spacing the opposed edges of the head and shell. Thereafter the circumferential butt weld 4 is made around the joint between the shell 1 and the head 2, preferably by the metallic arc welding process, in which weld metal is deposited on and fused with the parts. An alloy rod is preferably employed in the welding operation to provide the first pass of weld metal and an ordinary steel weld rod is employed for the subsequent pass or passes. The welding operation melts the feet of the rings 7 and 8 together within the joint 4 and integrally joins the head and shell to one another.

The rings 7 and 8, disposed as they are in a substantially parallel overlapping position adjacent the lining of the shell 1 and the head 2, prevent circulation of fluid to the metal of the tank between the edge of the ceramic lining and the joint, that might otherwise be exposed and susceptible to corrosion, as well as to the weld metal deposited in the joint 4. The fusing of the rings 7 and 8 together at the bottom of the joint protects the outer weld deposit 12 from corrosion.

The invention may be readily employed in the joining together of any tubular parts such as pipe members or half shells of hot water tanks.

The invention in being adapted for use in a butt welded joint is particularly desirable for employment in containers having pressures developed therein by contained fluid, such as hot water tanks. In a tank having butt welded joints there is no tendency to deflect the shell or heads of the tank by pressure being exerted at the joints. The stress resulting from internal fluid pressure is comparatively equal throughout the tank. The invention therefore provides a very strong and durable structure.

Various embodiments of the invention may be employed within the scope of the accompanying claims.

I claim:

1. In a butt welded joint between the opposed edges of two metallic members having a non-weldable corrosion resistant lining on their inner surfaces and extending to a position adjacent the weld, a thin corrosion resistant metallic strip beneath the weld on the inside of said members and fused with the weld metal at the base of the joint, said strip extending on either side of said joint in tight overlapping engagement with said lining for a substantial distance from the joint to prevent circulation of corroding media in contact with the metal of said members between the joint and the edges of said lining.

2. In a butt welded joint between two generally cylindrical members having corrosion resistant linings of ceramic enamel extending to a position adjacent the weld, a thin corrosion resistant metallic ring fused with the weld metal at the base of the joint and extending in opposite directions from the joint in tightly fitting relation to said members and overlapping said linings for a substantial distance longitudinally of the members to prevent circulation of corroding media in contact with the metal of said members adjacent the joint.

3. In a butt welded joint between two generally cylindrical parts having non-weldable corrosion resistant linings extending to a position adjacent the weld, separate substantially cylindrical thin corrosion resistant metallic inserts fused together and to the weld at the base of the latter and extending in opposite directions therefrom in substantially tight overlapping contact with the linings of the respective parts to cover the weld and the portion of the parts adjacent the weld which would otherwise be exposed to corrosion.

4. In an alloy butt welded joint between two generally cylindrical parts having corrosion resistant linings of fused ceramic enamel extending to a position adjacent the weld, separate substantially cylindrical thin corrosion resistant alloy rings fused together and to the weld at the base of the latter and extending in opposite directions therefrom for a substantial distance in tight overlapping contact with the linings of the respective parts to prevent circulation of contained fluid to the exposed metal at the joint.

5. In an alloy butt welded joint between two generally cylindrical parts having corrosion resistant linings of ceramic enamel material extending to a position adjacent the weld, weld metal securing the opposed edges of the parts together, and separate substantially cylindrical rings outwardly flanged at one end and inwardly turned at the other free end to provide a spring action therein, the flanged ends of said rings being welded together in abutting relation to each other within said joint to substantially protect the weld from corrosion, and the spring action of the rings holding the inwardly turned free ends thereof in tight engagement with the lining of the respective parts to thereby prevent circulation of contained fluid to the metal at the joint.

6. In an alloy butt welded joint between two generally cylindrical parts having corrosion resistant linings extending to a position adjacent the weld, weld metal securing the opposed edges of the parts together, and a thin corrosion resistant metallic ring having an outwardly bent central portion fused with the weld metal at the base of the joint and extending in opposite directions from the joint in tightly fitting relation to said members and overlapping said linings, the outer free edges of said ring being flanged inwardly to provide a spring action to press the ring against the respective linings of the parts to thereby prevent circulation of the contained fluid to the metal at the joint.

WILLIAM E. CRAWFORD.